(12) United States Patent
Leimenstoll et al.

(10) Patent No.: US 7,923,574 B2
(45) Date of Patent: Apr. 12, 2011

(54) PREPOLYMERS

(75) Inventors: Marc Leimenstoll, Hilden (DE); Burkhard Köhler, Zierenberg (DE); Christos Karafilidis, Düsseldorf (DE); Matthias Wintermantel, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/390,811

(22) Filed: Feb. 23, 2009

(65) Prior Publication Data
US 2009/0247721 A1 Oct. 1, 2009

(30) Foreign Application Priority Data

Feb. 27, 2008 (DE) .......................... 10 2008 011 472

(51) Int. Cl.
*C07C 261/00* (2006.01)
(52) U.S. Cl. .............. 560/115; 528/61; 528/78; 528/59; 564/44; 564/45; 560/25; 560/26; 560/158

(58) Field of Classification Search ............... 528/59, 528/61, 78; 564/44, 45; 560/25, 26, 115, 560/158
See application file for complete search history.

(56) References Cited

U.S. PATENT DOCUMENTS

| 4,028,310 A | 6/1977 | Schäfer et al. |
| 4,282,330 A * | 8/1981 | Austin .......................... 521/118 |
| 2002/0123596 A1 | 9/2002 | Gurtler et al. |

FOREIGN PATENT DOCUMENTS

| DE | 2436740 A1 | 2/1976 |
| DE | 10110437 A1 | 9/2002 |

* cited by examiner

Primary Examiner — Milton I Cano
Assistant Examiner — Michael Leonard
(74) Attorney, Agent, or Firm — Connolly Bove Lodge & Hutz LLP

(57) ABSTRACT

The invention relates to novel prepolymers which are accessible from the formamides of oligomeric di- or polyamines (formamide-terminated oligomers) and di- or polyisocyanates.

13 Claims, No Drawings

PREPOLYMERS

RELATED APPLICATIONS

This application claims benefit to German Patent Application No. 10 2008 011 472.3, filed Feb. 27, 2008, which is incorporated herein by reference in its entirety for all useful purposes.

BACKGROUND OF THE INVENTION

The invention relates to novel prepolymers which are accessible from the formamides of oligomeric di- or polyamines (formamide-terminated oligomers) and di- or polyisocyanates.

Isocyanate-functional prepolymers of polyols and polyisocyanates have been known for a long time and are the basis of many existing commercial products.

For many uses, in particular in the fields of lacquers and adhesives, prepolymers having a low viscosity are desirable.

Prepolymers of diisocyanates and formamide-terminated oligomers are novel and are not known in the literature.

It has now been found that acylurea prepolymers which are distinguished by a low viscosity are accessible from formamide-terminated oligomers and polyisocyanates.

EMBODIMENTS OF THE INVENTION

An embodiment of the present invention is a prepolymer of diisocyanates and formamide-terminated oligomers.

Another embodiment of the present invention is the above prepolymer, wherein said prepolymer is of formula (I)

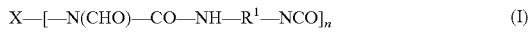

wherein
X is an n-valent organic radical.

Another embodiment of the present invention is the above prepolymer, wherein X is a radical of formula (II)

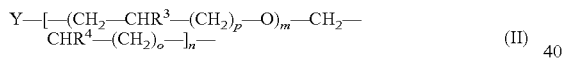

wherein
Y is an n-functional saturated C2-C6 radical;
$R^1$ is a C6-C13-arylalkyl radical or a C4-C13-alkylene radical;
$R^3$ is hydrogen or methyl;
$R^4$ represents hydrogen or methyl;
m is a natural number from 2 to 30;
n is a natural number from 2 to 4;
o is 0 or 1; and
p is 0, 1, or 2.

Another embodiment of the present invention is the above prepolymer, wherein,
$R^4$ is methyl;
o is 0; and
p is 0.

Yet another embodiment of the present invention is a process for preparing the above prepolymer, comprising reacting a diisocyanate with a formamide-terminated oligomer and separating any excess of said diisocyanate off by distillation.

Yet another embodiment of the present invention is a process for preparing the above prepolymer, comprising reacting n to (n×10) moles of a diisocyanate of formula (III)

wherein
$R^1$ is a C6-C13-arylalkyl radical or a C4-C13-alkylene radical; and
n is a natural number from 2 to 4;

with one mole of formamide-terminated oligomer of formula (IV)

wherein
X is a radical of formula (II)

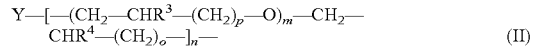

wherein
Y is an n-functional saturated C2-C6 radical;
$R^1$ is a C6-C13-arylalkyl radical or a C4-C13-alkylene radical;
$R^3$ is hydrogen or methyl;
$R^4$ represents hydrogen or methyl;
m is a natural number from 2 to 30;
n is a natural number from 2 to 4;
o is 0 or 1; and
p is 0, 1, or 2; and
n is a natural number from 2 to 4;
and separating any excess of said diisocyanate off by distillation.

Yet another embodiment of the present invention is a PU shaped or foamed article comprising the prepolymer of claim 1.

Yet another embodiment of the present invention is an adhesive comprising any of the above prepolymers.

Yet another embodiment of the present invention is a sealant comprising any of the above prepolymers.

Yet another embodiment of the present invention is a lacquer comprising any of the above prepolymers.

DESCRIPTION OF THE INVENTION

The invention therefore provides prepolymers of diisocyanates and formamide-terminated oligomers.

These are preferably prepolymers of the general formula I

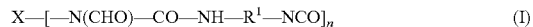

wherein
X represents an n-valent organic radical, preferably a radical of the formula II

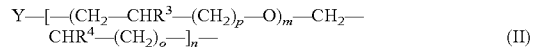

wherein
Y represents an n-functional saturated C2-C6 radical,
$R^1$ represents a C6-C13-arylalkyl radical or a C4-C13-alkylene radical,
$R^3$ represents hydrogen or methyl,
$R^4$ represents hydrogen or methyl, preferably methyl,
m represents a natural number from 2 to 30,
n represents a natural number from 2 to 4,
o represents 0 or 1, preferably 0, and
p represents 1 or 2, preferably 0.

The invention also provides a process for the preparation of the prepolymers according to the invention, characterized in that diisocyanates are reacted with a formamide-terminated oligomer and the excess of diisocyanate which may be present is separated off by distillation.

Preferably, according to the invention n to (n×10) moles of diisocyanates of the formula (III)

wherein $R^1$ and n have the abovementioned meaning,
are reacted with one mole of formamide-terminated oligomer of the formula (IV)

wherein X and n have the abovementioned meaning, and the excess of diisocyanate which may be present is separated off by distillation.

Formamide-terminated oligomers, in particular the formamide-terminated oligomers of the formula (IV), are accessible, for example, by reaction of formic acid C1-C4-alkyl esters with amines of the formula (V)

$$X\text{—}[NH_2]_n \qquad (V),$$

wherein X and n have the abovementioned meaning.

The reaction is preferably carried out in an excess of formic acid C1-C4-allyl ester, preferably methyl formate or ethyl formate, at the boiling temperature of the formic acid esters, and after the reaction of the amino group to give the formamide group has taken place, the excess and the alkanol likewise formed, preferably methanol or ethanol, is distilled off. The reaction of the polyamines V to give the formamide-terminated oligomers IV with formic acid or other formic acid derivatives, such as carbon monoxide, mixed formic acid-carboxylic acid anhydrides, low molecular weight amides or active esters of formic acid or precursor reaction products of formic acid with amide coupling reagents, such as carbodiimides or condensed phosphoric acid derivatives, is possible, but not preferred. The reaction of formamide, or the anion of formamide generated with a strong base, with alkylating reagents of the formula (VI)

$$X\text{—}[A]_n,$$

wherein X and n have the abovementioned meaning and A represents a leaving group, such as chloride, bromide, iodide, mesylate, tosylate or triflate, is likewise possible, but not preferred.

Amines of the formula (V) which are employed are, preferably, polyether-amines from BASF or Jeffamines from Huntsman. These are polyethylene glycols, polypropylene glycols or polytetrahydrofurans which are preferably amino-functionalized with a group of the structure

—CH$_2$—CH(CH$_3$)—NH$_2$ or

—CH$_2$—CH$_2$—CH$_2$—NH$_2$.

The reaction of the formamide-terminated oligomers with the isocyanates is carried out at temperatures of from 40 to 120° C. in the presence or absence, preferably in the absence, of catalysts, such as compounds of zinc or of tin. The diisocyanate is preferably employed in 3-8 times the molar amount, based on the formamide-terminated oligomer, and the excess is removed by thin film distillation in vacuo after the reaction to give the acylurea prepolymer.

Diisocyanates which are used according to the invention are e.g. 2,4-TDI, 2,6-TDI, 2,4'-MDI, 4,4'-MDI, 1,3-diisocyanatobenzene, 1,4-diisocyanatobenzene, HDI, IPDI, 4,4-diisocyanatocyclohexylmethane, bisisocyanatomethylnorbornane, bisisocyanatomethylbenzene or bisisocyanatomethylcyclohexane.

The prepolymers according to the invention can be used in all fields where the prepolymers corresponding to the prior art are also employed, such as adhesives, lacquers, PU shaped or foamed articles or sealants. In this context, they have the advantage in particular of a relatively low viscosity.

Low viscosities are particularly advantageous e.g. in the uses of "flexible packaging" or "reactive polyurethane hot-melt adhesives" (hotmelts). Flexible packaging is understood here as meaning the production of composite films by gluing with an adhesive based on polyurethane. In this case, the adhesive is typically applied in liquid form to a film and directly thereafter joined with a second film. Reactive polyurethane hot-melt adhesives are understood as meaning adhesive systems which are in the form of a melt at elevated temperatures and are applied in liquid form at these temperatures. After application and joining, the still reactive adhesive cools and thereby builds up a rapid initial strength. The final strength is achieved after complete curing with moisture from the atmosphere.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Starting substances used:

Desmodur® T80 (Bayer MaterialScience AG, Leverkusen, DE), an 80:20 mixture of 2,4- and 2,6-TDI, Desmophen® 1262 BD (Bayer MaterialScience AG, Leverkusen, DE), a difunctional polypropylene oxide of molar mass $M_n$=400, Jeffamine® ED600 (Huntsman, UK), a difunctional amino-terminated poly-ethylene-co-propylene glycol of molar mass $M_n$=600, Jeffamine® D400 (Huntsman, UK), a difunctional amino-terminated polypropylene glycol of molar mass $M_n$=400 and Irganox® 1076 (Ciba, CH), a sterically hindered phenol.

Example 1

400 g of formic acid ethyl ester are added dropwise to 400 g of Jeffamine® ED600 at 25° C. in the course of 4 h and the mixture is subsequently stirred for 4 h. The excess formic acid ethyl ester and the ethanol formed are then distilled off. The formamide-terminated oligomer formed is added dropwise to 2,088 g of Desmodur® T80, 1 g of Irganox® 1076 and 2 g of benzoyl chloride at 80° C. in the course of 2 h and the mixture is subsequently stirred at 80° C. for 8 h. The excess Desmodur® T80 is then separated off in a thin film distillation at 130° C.

An acylurea prepolymer having an NCO content of 9.2% and viscosities as shown in Table 1 is obtained.

Example 2

400 g of formic acid ethyl ester are added dropwise to 400 g of Jeffamine® D400 at 25° C. in the course of 4 h and the mixture is subsequently stirred for 4 h. The excess formic acid ethyl ester and the ethanol formed are then distilled off The formamide-terminated oligomer formed is added dropwise to 2,088 g of Desmodur® T80 and 2 g of benzoyl chloride at 80° C. in the course of 2 h and the mixture is subsequently stirred at 80° C. for 8 h. The excess Desmodur® T80 is then separated off in a thin film distillation at 130° C.

An acylurea prepolymer having an NCO content of 10.4% and viscosities as shown in Table 1 is obtained.

Comparison Example 265.98 g of Desmophen° 1262 BD are added dropwise to 535.02 g of Desmodur® T80 at 80° C. in the course of 2 h and the mixture is subsequently stirred for 8 h. The excess Desmodur® T80 is then separated off by thin film distillation at 130° C.

An acylurea prepolymer having an NCO content of 10.4% and viscosities as shown in Table 1 is obtained.

TABLE 1

Viscosities of Examples 1 and 2 and of the comparison example at various temperatures

| at ° C. | Viscosity in mPas | | |
|---|---|---|---|
| | Example 1 | Example 2 | Comparison example |
| 25 | 17,357 | 206,280 | cannot be measured |
| 50 | 1,378 | 5,403 | 16800 |
| 75 | 275 | 571 | 1410 |
| 100 | 92 | 132 | 898 |

The invention claimed is:

1. A prepolymer of diisocyanates and formamide-terminated oligomers, wherein said prepolymer is of formula (I)

X—[—N(CHO)—CO—NH—R$^1$—NCO]$_n$ (I)

wherein
R$^1$ is a C6-C13-arylalkyl radical or a C4-C13-alkylene radical;
n is a natural number from 2 to 4;
X is an n-valent organic radical.

2. The prepolymer of claim 1, wherein X is a radical of formula (II)

Y—[—(CH$_2$—CHR$^3$—(CH$_2$)$_p$—O)$_m$—CH$_2$—CHR$^4$—(CH$_2$)$_o$—]$_n$— (II)

wherein
Y is an n-functional saturated C2-C6 radical;
R$^3$ is hydrogen or methyl;
R$^4$ represents hydrogen or methyl;
m is a natural number from 2 to 30;
n is a natural number from 2 to 4;
o is 0 or 1; and
p is 0, 1, or 2.

3. The prepolymer of claim 2, wherein,
R$^4$ is methyl;
o is 0; and
p is 0.

4. A process for preparing the prepolymer of claim 1, comprising reacting a diisocyanate with a formamide-terminated oligomer and separating any excess of said diisocyanate off by distillation.

5. A process for preparing the prepolymer of claim 2, comprising reacting
n to (n×10) moles of a diisocyanate of formula (III)

OCN—R$^1$—NCO (III), wherein
R$^1$ is a C6-C13-arylalkyl radical or a C4-C13-alkylene radical; and
n is a natural number from 2 to 4;
with one mole of formamide-terminated oligomer of formula (IV)

X—[—NH(CHO)]$_n$ (IV), wherein
X is a radical of formula (II)

Y—[—(CH$_2$—CHR$^3$—(CH$_2$)$_p$—O)$_m$—CH$_2$—CHR$^4$—(CH$_2$)$_o$—]$_n$— (II)

wherein
Y is an n-functional saturated C2-C6 radical;
R$^3$ is hydrogen or methyl;
R$^4$ represents hydrogen or methyl;
m is a natural number from 2 to 30;
n is a natural number from 2 to 4;
o is 0 or 1; and
p is 0, 1, or 2; and
n is a natural number from 2 to 4;
and separating any excess of said diisocyanate off by distillation.

6. A PU shaped or foamed article comprising the prepolymer of claim 1.

7. An adhesive comprising the prepolymer of claim 1.

8. A sealant comprising the prepolymer of claim 1.

9. A lacquer comprising the prepolymers of claim 1.

10. A PU shaped or foamed article comprising the prepolymer of claim 2.

11. An adhesive comprising the prepolymer of claim 2.

12. A sealant comprising the prepolymer of claim 2.

13. A lacquer comprising the prepolymers of claim 2.

* * * * *